(12) United States Patent
Chen

(10) Patent No.: US 7,176,974 B2
(45) Date of Patent: Feb. 13, 2007

(54) METHOD OF POSITIONING BY USING IMAGE

(76) Inventor: Shu-Fen Chen, P.O. Box 2103, Taichung (TW)

( * ) Notice: Subject to any disclaimer, the term of this patent is extended or adjusted under 35 U.S.C. 154(b) by 800 days.

(21) Appl. No.: 10/347,609

(22) Filed: Jan. 21, 2003

(65) Prior Publication Data

US 2004/0140952 A1    Jul. 22, 2004

(51) Int. Cl.
*H04N 5/225*    (2006.01)
*H04N 9/47*    (2006.01)

(52) U.S. Cl. ................ 348/335; 348/135; 348/169

(58) Field of Classification Search .......... 348/135, 348/169–175, 335; 345/165–166; 356/4.01, 356/4.03, 138, 139.01, 140, 140.2, 140.5, 356/141.4, 147, 614, 622–623
See application file for complete search history.

(56) References Cited

U.S. PATENT DOCUMENTS 5,196,900 A * 3/1993 Pettersen ............... 356/141.4
5,400,134 A * 3/1995 Obkircher ............... 356/141.2
6,346,980 B1 * 2/2002 Tani et al. ............... 356/4.01

* cited by examiner

Primary Examiner—Vivek Srivastava
Assistant Examiner—James M. Hannett
(74) Attorney, Agent, or Firm—Rosenberg, Klein & Lee

(57) ABSTRACT

A method of positioning by using image uses an image-collecting device with a known angle of view to gain a digital image. A pixel matrix of the digital image is defined as the known angle of view and a gap between every two adjacent pixels of each horizontal line and each longitudinal line is an equally divided angle of the known angle. A displaying objective is shown on an image sensor and has a datum point of computing of a position angle. A camera lens has a principal axis directing to the datum point such that a calculating unit can compute an angle formed between the displaying objective and the principal axis.

7 Claims, 4 Drawing Sheets

METHOD OF POSITIONING BY USING IMAGE

BACKGROUND OF THE INVENTION

1. Field of the Invention

The present invention relates to a method of positioning, and more particularly to a method of positioning by using image.

2. Description of Related Art

The image collected by Charge Coupled Device (CCD) or Complementary Metal-Oxide Semiconductor (CMOS) is extensively used in physics analyzing and server positioning. The analyzing mode uses the chromatism of the filmed object to define a geometry area of the filmed object and a center of the geometry area, and the image pixel matrix to compute a precise quadrant range data or angle data that is provide to a server device as a propel data. For example, using the above skill in punching holes in a printed circuit board, the calculating unit of the punching machine will compute the center of a mark that is indicated on the a work piece when the mark is collected by CCD or CMOS and shown on a display. Then the calculating unit of the punching machine will compute the geometry center of the mark and the punching machine will move the work piece to make the geometry center of the mark aligning with an axis of the punch of the punching machine.

However, until nowadays, major of the skill of sever positioning is used in a scope of two dimensions. The serving positioning device will cause a mechanical error under a condition of long distance moving when a great displacement is necessary.

Another serving positioning device is used with firing weapon. The targeting way of the firing weapon is nothing more than manual operated or radar detecting. However, the manual operated targeting way will cause a manual error and the radar detecting will take a lot of cost such that the two ways of targeting are not suitable to a light-duty firing weapon.

The present invention has arisen to mitigate and/or obviate the disadvantages of the conventional method of positioning by using image.

SUMMARY OF THE INVENTION

The main objective of the present invention is to provide an improved method of positioning by using image.

To achieve the objective, the method of positioning by using image in accordance with the present invention uses an image-collecting device with a known angle of view to gain a digital image. A pixel matrix of the digital image is defined as the known angle of view and a gap between every two adjacent pixels of each horizontal line and each longitudinal line is an equally divided angle of the known angle. A displaying objective is shown on an image sensor and has a datum point of computing of a position angle. A camera lens has a principal axis directing to the datum point such that a calculating unit can compute an angle formed between the displaying objective and the principal axis.

Further benefits and advantages of the present invention will become apparent after a careful reading of the detailed description with appropriate reference to the accompanying drawings.

DETAILED DESCRIPTION OF THE INVENTION

Figure 1:
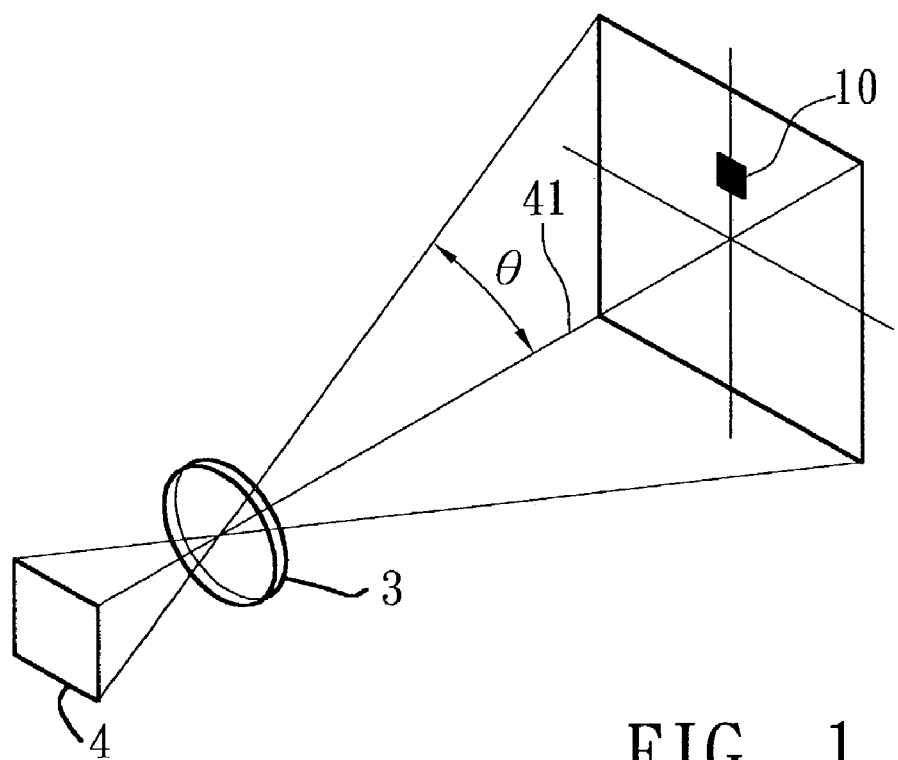
FIG. 1 is a diagram showing the effects of a collimated illumination beam of the present invention.
Figure 2:
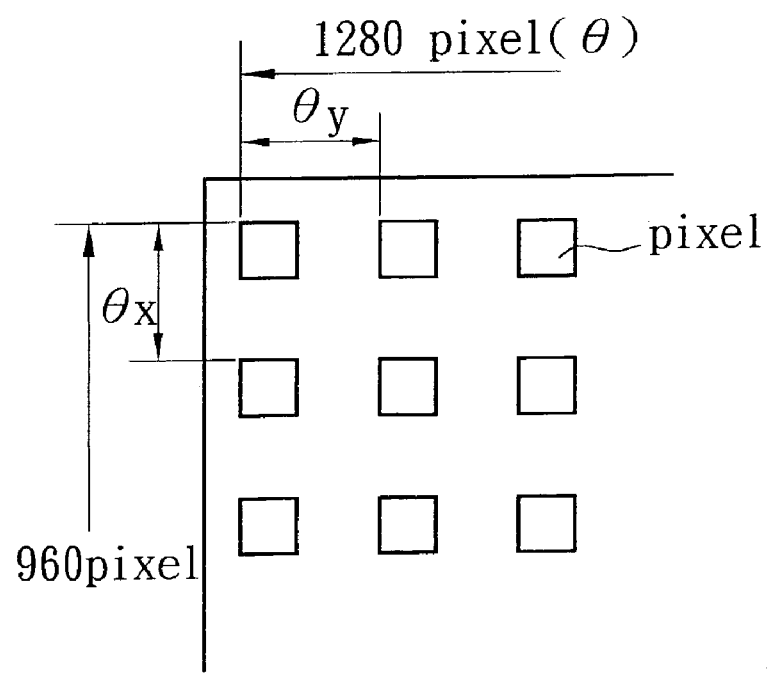
FIG. 2 is a plan view of the method of positioning in accordance with the present invention by using image sensor.

With reference to FIGS. 1 and 2, the method of positioning by using image in accordance with the present invention uses an image-collecting device with a known angle of view as a digital image source of a display. The known angle of view of the image-collecting device is the angle of view through a camera lens or the format size of the image sensor (4) of the focal plane of the camera lens. The pixel matrix of the digital image is defined as a known angle of view and the gap between every two adjacent pixels of each horizontal line and each longitudinal line is an equally divided angle of the known angle. The angle of view of the camera lens is $\theta$ and the pixels of the sensing chip is 1280×960 such that the gap ($\theta_y$) between every two adjacent pixels of the longitudinal lines is $\theta/1280$ and the gap ($\theta_x$) between every two adjacent pixels of the horizontal lines is $\theta/960$.

Figure 3:
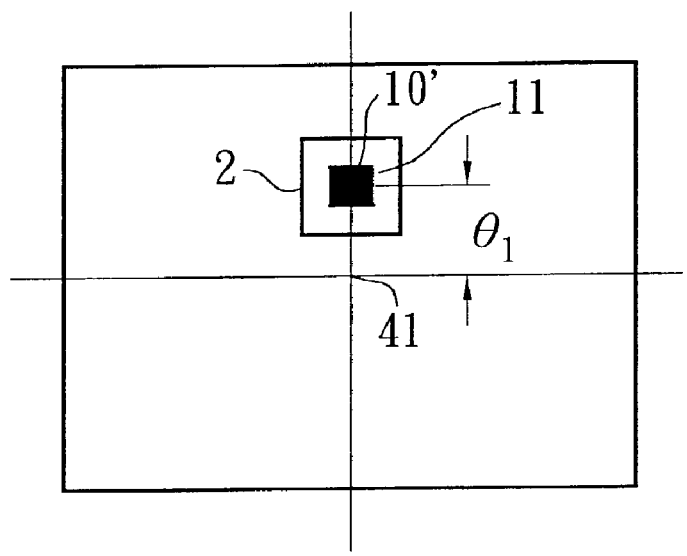
FIG. 3 is a plan view showing the target displaying on a monitor.
Figure 4:
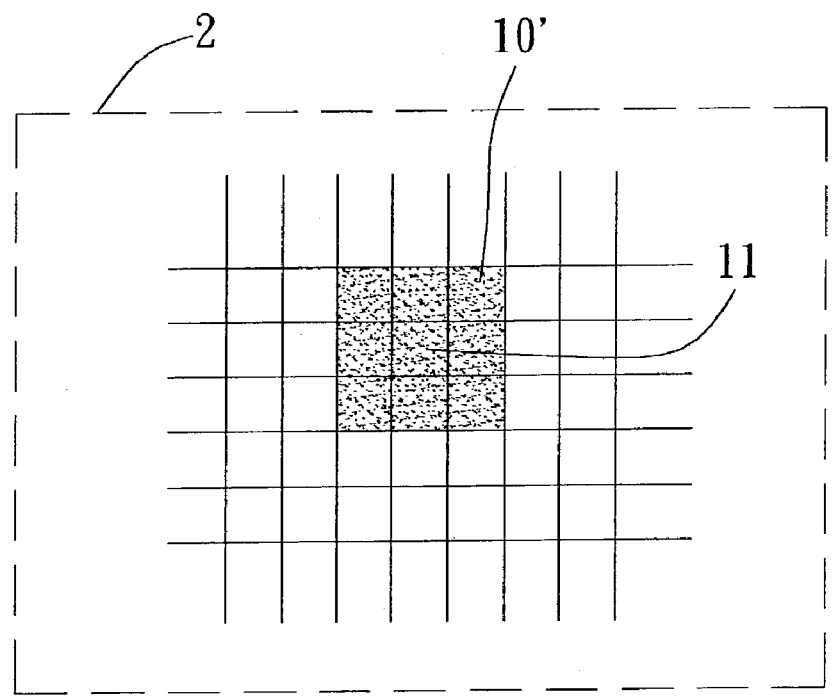
FIG. 4 is a magnify view of a pixel of the target in FIG. 3.

With reference to FIGS. 1 and 3, the objective (10) is shown on the image sensor (4) as a displaying objective (10'). The displaying objective (10') is marked in a pixel area (2) on the image sensor (4) by a selecting unit (not shown) and the calculating unit will compute the geometry center of the pixel area (2). In the preferred embodiment of the present invention, the selecting unit is a mouse. With reference to FIG. 4, the point (11) is the datum point of computing of the position angle of the displaying objective (10'). The camera lens (3) has a principal axis (41) directing to the point (11) such that the calculating unit can compute an angle ($\theta_1$) formed between the displaying objective (10') and the principal axis (41). A recording unit (not shown) is provide to remember the angle ($\theta_1$) such that the calculating unit will compute again when another objective appears within the angle of view of the camera lens.

Figure 5:
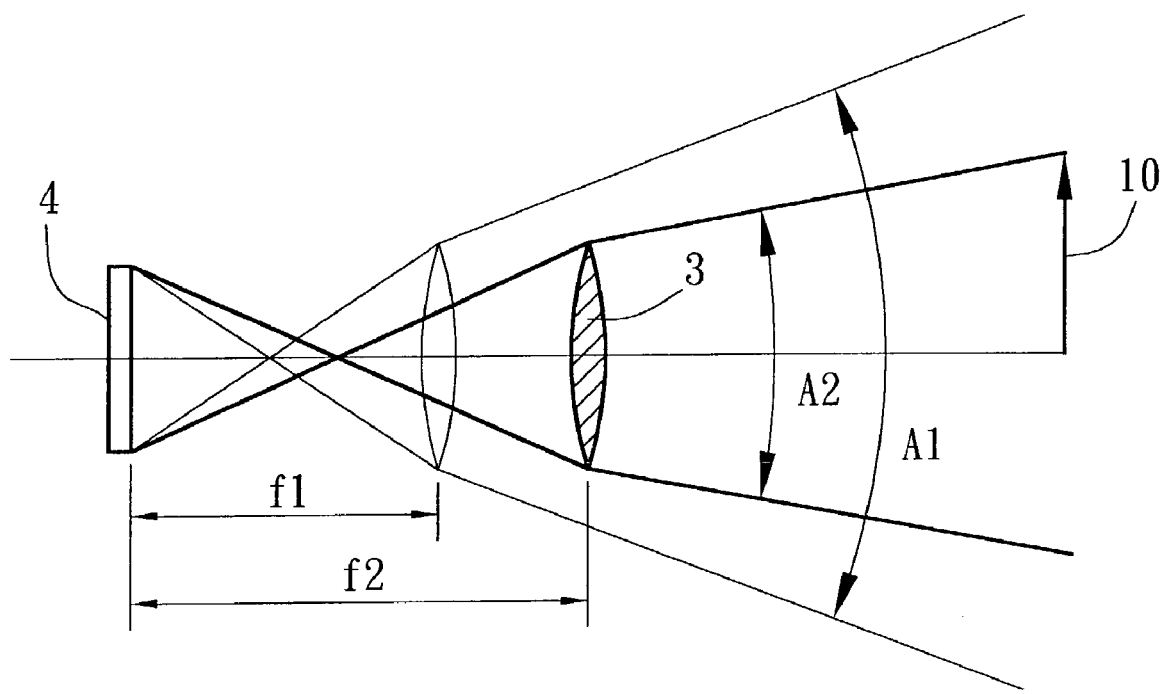
FIG. 5 is a diagram showing the effects of a collimated illumination beam of the present invention that imaged by two focuses.
Figure 6:
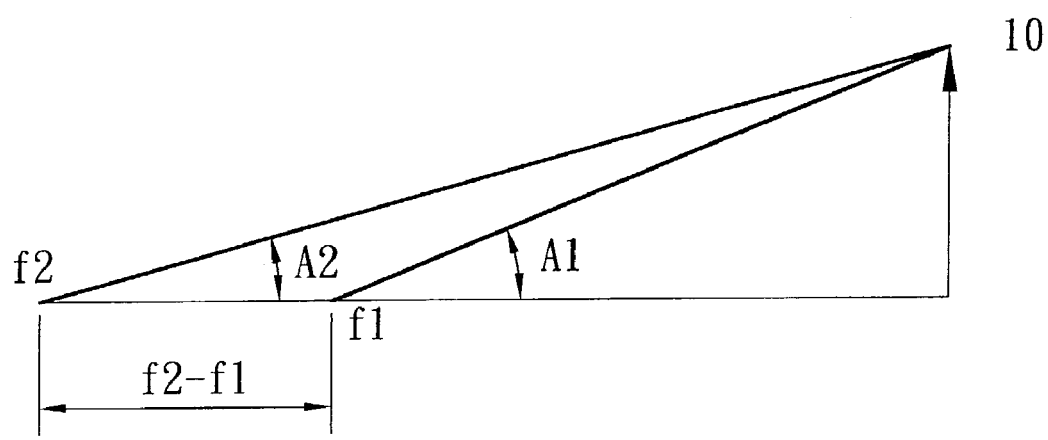
FIG. 6 is a simplified view of FIG. 5.
Figure 7:
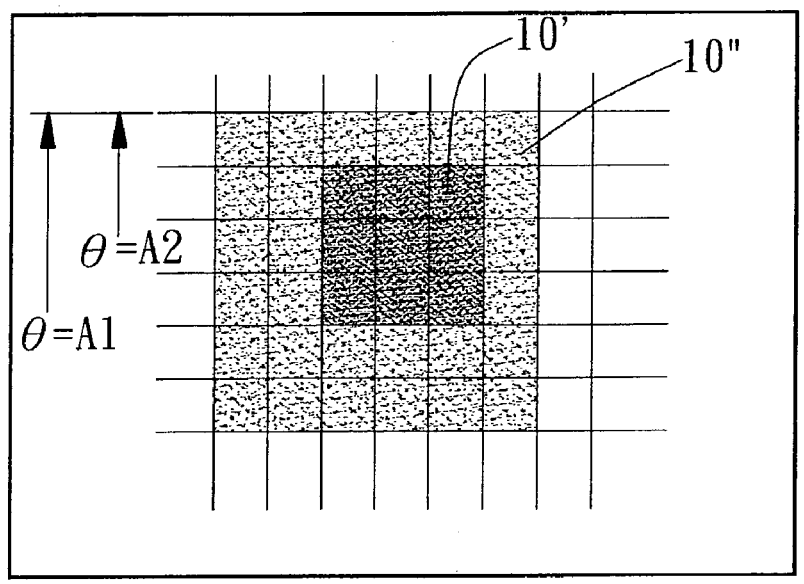
FIG. 7 is a plan view showing the target displaying on a monitor that imaged by two focuses as show in FIG. 5.

With reference to FIGS. 5–7, it is another embodiment of the present invention. In the embodiment, the camera lens is adjustable and has at least two focal lengths ($f_1$, $f_2$) and at least two angles of view ($A_1$, $A_2$) for adjusting the size of the displaying objective (10') and computing the change of the angles of view. As shown in FIG. 6, the formula between the two focal lengths ($f_1$, $f_2$) and the two angles of view ($A_1$, $A_2$) is as followed.

$$\tan A_1 \times f_1 = \tan A_2 \times f_2$$

As described above, the method of positioning in accordance with the present invention can provide propel data to the server device for adjusting an angle correcting range of positioning device. The preciseness and the pixel of the image sensor (4) are directed proportion, that is, the angle correcting range is more precise when the pixel has a great number. For example, as used in a firing weapon, the calculating unit will compute an azimuth and a distance of the objective in distance place and the amendment range relative to the distance and the trajectory of the firing weapon when the objective in locked on the image sensor (4). Consequently, the aiming process of firing weapon is quick and precise. Furthermore, the image can be transmitted to a monitor in a distance place by cable or network for aiming the objective to prevent the operator from exposing in a dangerous condition.

Figure 8:
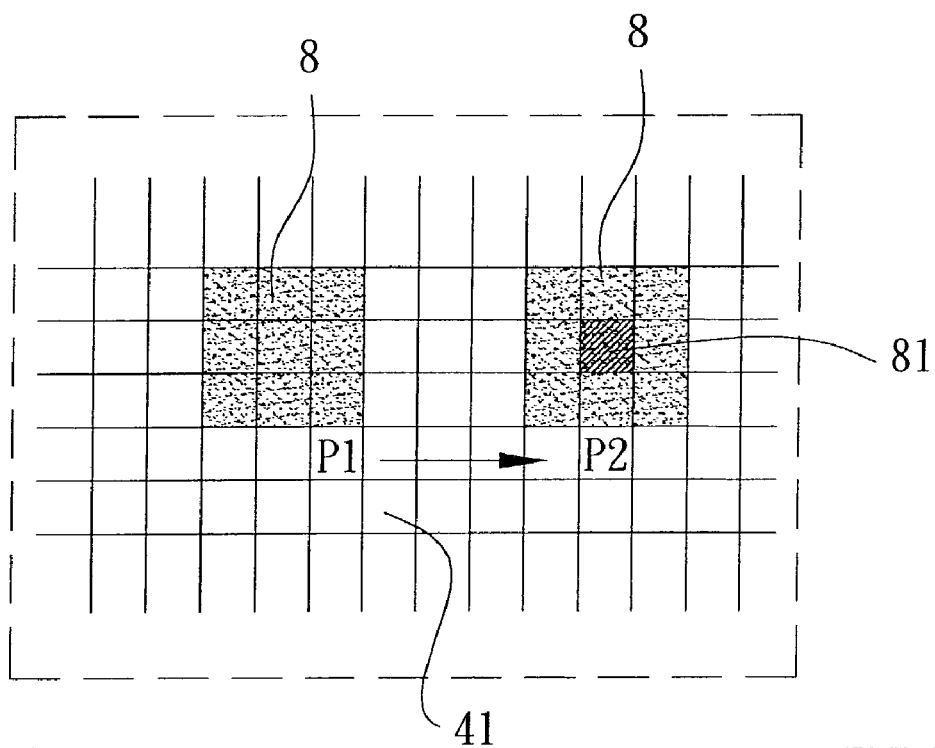
FIG. 8 is a plan view showing a moving target displaying on a monitor.

With reference to FIG. 8, the monitor is not very necessary to the method of the present invention because the positioning process is not finished by manual labor. The displaying objective is selected by the calculating unit due to the digital image pixels (8) of the moving objective within the angle of view of the image collecting device when the digital image pixels moves form point ($P_1$) to point ($P_2$). The calculating unit will compute a new geometry center (81) as a base for next computing. As described above, the calculating unit will compute an angle formed between the displaying objective (81) and the principal axis (41). For example, using the skill in a monitoring system, the calculating unit will start a video device when a moving objective moves into the angle of view of the camera lens. However, the method of the present invention can promote the function of the monitoring system. The method of the present invention can further compute the last position of the moving objective for next computing by using the calculating unit. Consequently, the server device of the image-collecting device can drive the camera lens to track to the moving objective.

Although the invention has been explained in relation to its preferred embodiment, it is to be understood that many other possible modifications and variations can be made without departing from the spirit and scope of the invention as hereinafter claimed.

What is claimed is:

1. A method of positioning by using image, comprising the steps of:

using an image sensor at a known angle of view to gain a digital image;

providing a pixel matrix of the digital image being defined as the known angle of view and a gap between every two adjacent pixels of each horizontal line and each longitudinal line being an equally divided angle of the known angle;

displaying an object imaged on the image sensor and displaying a datum point used for computing of a position angle;

providing a camera lens having a principal axis corresponding to the datum point such that a calculating unit can compute an angle formed between the displayed object and the principal axis, the camera lens having at least two focal lengths and at least two angles of view corresponding to the two focal lengths to thereby be adjustable for adjusting a size of the displaying objective and the calculating unit computing a change of the angles of view.

2. The method of positioning by using image as claimed in claim 1, wherein the known angle of view of the image-collecting device is the angle of view through the camera lens.

3. The method of positioning by using image as claimed in claim 1, wherein the known angle of view of the image-collecting device is a format size of an image sensor of a focal plane of the camera lens.

4. The method of positioning by using image as claimed in claim 1, wherein the displaying objective is selected by the calculating unit due to the digital image pixels of a moving objective within the angle of view of the image-collecting device.

5. The method of positioning by using image as claimed in claim 1, wherein the known angle of view is used as a digital image source of a display, the displaying objective marked in a pixel area on an image sensor by a selecting unit and the calculating unit computing a geometry center of the pixel area.

6. The method of positioning by using image as claimed in claim 5, wherein the selecting unit is a mouse for marking the displaying objective.

7. The method of positioning by using image as claimed in claim 5, wherein a recording unit is provide to remember the angle that is formed between the displaying objective and the principal axis such that the calculating unit computes again when another objective appears within the angle of view of the camera lens.

* * * * *